(12) United States Patent
Krasieva et al.

(10) Patent No.: US 6,661,574 B2
(45) Date of Patent: Dec. 9, 2003

(54) DIFFUSE OPTICS ILLUMINATOR FOR REFLECTANCE MICROSCOPY AND METHOD OF PROVIDING DIFFUSE LIGHT FOR REFLECTANCE MICROSCOPY

(75) Inventors: Tatiana B. Krasieva, Irvine, CA (US); Alexander S. Dvornikov, Irvine, CA (US); Bruce J. Tromberg, Irvine, CA (US); Michael W. Berns, Bonsall, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/126,141

(22) Filed: Apr. 19, 2002

(65) Prior Publication Data
US 2003/0197926 A1 Oct. 23, 2003

(51) Int. Cl.[7] ............................ G02B 21/06; G02B 21/00
(52) U.S. Cl. ....................... 359/385; 359/368; 359/389; 359/599
(58) Field of Search ............................... 359/368–390, 359/599, 207

(56) References Cited

U.S. PATENT DOCUMENTS

| 4,735,497 A | * | 4/1988 | Elterman | .................... 359/385 |
| 4,906,083 A | * | 3/1990 | Sattler | .................... 359/386 |
| 5,187,611 A | * | 2/1993 | White et al. | ................. 359/599 |
| 5,734,498 A | * | 3/1998 | Krasieva et al. | ............. 359/387 |
| 5,781,338 A | * | 7/1998 | Kapitza et al. | ............. 359/398 |

\* cited by examiner

Primary Examiner—Thong Q. Nguyen
(74) Attorney, Agent, or Firm—Daniel L. Dawes; Myers Dawes Andras & Sherman LLP

(57) ABSTRACT

An illuminator and a reflectance microscope or system utilizing the illuminator for eliminating the need of a special light source, a reflected light vertical illuminator, and condenser lenses. The system may utilize an ordinary light source. The illuminator includes embedded chromophoric and diffusion properties. The illuminator further has a size and a shape to enable proximate positioning relative to the specimen to be observed. The illuminator further has an opening or aperture through which the specimen may be viewed. As such, the opening of the illuminator permits placement of the illuminator between the objective lens and the specimen. This positioning enables reflectance type or dark field microscopy with a simple and durable illuminator without complex optics. A method of using the reflectance microscope includes illuminating a specimen by the illuminator on a same side of the specimen as is the objective lens relative to a plane of the specimen normal to the optical path.

19 Claims, 2 Drawing Sheets

DIFFUSE OPTICS ILLUMINATOR FOR REFLECTANCE MICROSCOPY AND METHOD OF PROVIDING DIFFUSE LIGHT FOR REFLECTANCE MICROSCOPY

BACKGROUND OF THE INVENTION

1. Field of the Invention

The instant invention relates to microscopy in general, and to reflectance microscopy in particular. The instant invention also specifically deals with illumination of a specimen to be observed.

2. Description of the Prior Art

Conventional reflectance or dark field microscopy utilizes condensing lenses and vertical illuminators, which usually tend to make for very complex and expensive systems. The related U.S. Pat. No. 5,734,498 issued to the same inventors overcame the need for expensive lighting and complex systems of condensing lenses for transmission light microscopy by the use of a chromophoric illuminator placed near the specimen to be observed. The same principles disclosed in U.S. Pat. No. 5,734,498 are applied in the instant invention. Therefore, U.S. Pat. No. 5,734,498 is incorporated herein in its entirety by reference thereto. However, U.S. Pat. No. 5,734,498 falls short of a solution for reflectance microscopy because reflectance microscopy generally requires a light source on a same side as is the objective lens relative to a plane of the specimen normal to the optical path. Specifically, light is not passed through the specimen from a side thereof opposite to the objective lens. Rather the specimen is observed due to light reflected off the specimen and back into the objective lens.

Therefore, there is a need for an illuminator that does not obstruct the line of view between the objective lens and the specimen.

There is a need to provide an illuminator that does not require the complexity of a plurality of condensing lenses and expensive lighting, and yet provides high resolution of the specimen during observation.

There is a need to provide an illuminator that is capable of emitting light when stimulated by a common or readily available, inexpensive light.

There is also a need to provide a narrow range of emitted frequencies to reduce spectral impurities from the illuminator. Furthermore, there is a need to provide emitted light from the illuminator that is isotropic.

Another need is to provide emitted light that is generally isotropic, but which emanates with greater intensity from portions of the illuminator. In most cases, the illuminator needs to have good diffusion. However, there is also a need in some cases to be able to selectively provide emitted, diffused light at greater intensity in some regions of the illuminator.

The instant invention achieves all the needs set forth above and specifically does so in a way that enables reflectance microscopy. In order to fulfill the stated needs, an illuminator having special size and shape characteristics was sought.

BRIEF SUMMARY OF THE INVENTION

In the preferred embodiment, the apertured illuminator is provided in the form of a toroid. Alternatively expressed, the illuminator is disk shaped with a cylindrical hole through the center of the disk. However, it is contemplated that the illuminator may be configured differently. For example, a U-shaped illuminator will also substantially surround a specimen and provide an aperture or opening through which viewing may occur. Alternatively, the illuminator may be provided in a plurality of pieces in order to occupy space on more than one side of the specimen and yet permit viewing through an opening between the pieces.

The illuminator of the instant invention is placed as close as possible to the specimen so that light emitted from the illuminator reaches the specimen and reflects off of the specimen with a sufficient intensity to reach the user's eye or the recording medium in a camera. Another advantage of the instant advantage is that a failure to illuminate the specimen properly is devoid of the myriad of adjustment variables that plagued the prior art systems having multiple condensing lenses. In the instant invention, if the illuminator is properly stimulated and is sufficiently close to the specimen, the specimen will be isotropically illuminated.

To locate the illuminator as close as possible to the specimen and permit unobstructed viewing of the specimen, the aperture is centered on a main axis of the objective lens. The illuminator is positioned between the specimen and the objective lens so that the emitted light (i.e., light emitted from the illuminator), strikes the side of the specimen facing the objective lens. In this configuration, emitted light reflects off the specimen and enters the user's eye or a camera via the objective lens.

The source of radiant energy or light may be located anywhere so long as radiant energy has a clear path from the source to the illuminator. The radiant energy may enter the illuminator through any of its surfaces so long as it has an angle of incidence within the critical angle for the material of the illuminator. Furthermore, shadowing by structural elements of the microscope such as the stage should be avoided as much as possible. Generally, the radiant energy or light source should be on the same side as is the objective lens relative to a plane of the specimen which plane is normal to the optical path. While the illuminator should be located on or in the nearest possible proximity to the specimen, the illuminator may be located on an opposite side of the stage from the specimen.

Radiant energy or light enters the illuminator and is diffused therein. The emitted light emanates from all of the surfaces of the illuminator. Generally, this emission is in a random and uniform manner. However, there are certain cases in which localized higher intensities of emissions are produced as set forth above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

An apertured illuminator provided a solution. The illuminator permits viewing of the specimen through the aperture while nearly surrounding the specimen, (at least on one side of a plane of the specimen normal to the optical path.) Thus, the advantages of the previous U.S. Pat. No. 5,734,498 are made available in reflectance microscopy as well as in transmission microscopy.

Indeed, all the advantages provided in the prior patent are made available in reflectance microscopy. Specifically, the illuminator of the instant invention does not require the complexity of a plurality of condensing lenses and expensive lighting, and yet provides high resolution of an image of the specimen during observation. Like the illuminators of the patent, the instant illuminator is capable of emitting light when stimulated by a common, inexpensive light source. The instant illuminator also emits light in a narrow range of frequencies, which reduces spectral impurities in the light emitted from the illuminator. Furthermore, the light emitted from the illuminator is isotropic.

An advantage that the instant invention achieves by its physical configuration, is that it provides additional discontinuities in the surfaces of the illuminator, which, when combined with certain chromophores, provides greater intensity of light emission at or near the discontinuities. While the variety of chromophores utilized together with the material that is embedded to cause diffusion provides generally isotropic emissions of light, some chromophores in combination with the added discontinuities of the aperture of the instant invention provide the advantage of localized high intensities of emitted light at the discontinuous regions of the illuminator.

Figure 1:
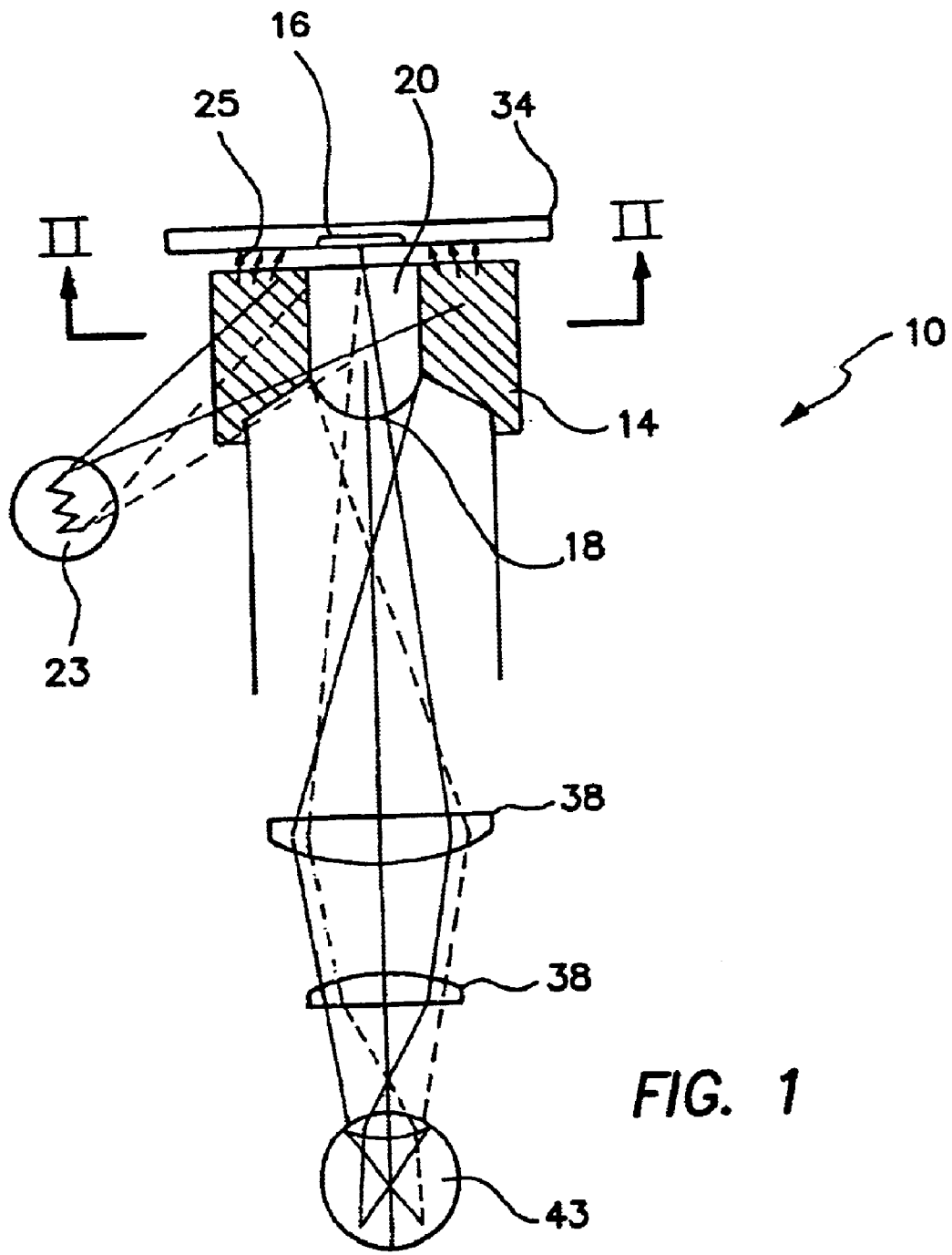
FIG. 1 is an schematic view of a reflectance microscope in accordance with the instant invention.

FIG. 1 shows a diagram of the microscope 10 of the instant invention utilizing an illuminator 14. The illuminator 14 is positioned between the specimen 16 and the objective lens 18 in this case. Specimen 16 is viewed through an aperture 20 defined through illuminator 14. The position of the illuminator between the objective lens 18 and the specimen 16 enables reflectance type microscopy since the specimen 16 reflects light, which is emitted from the illuminator, through the opening 20 and through the objective lens 18. It is to be explicitly understood that while the illuminator 14 is described as having an aperture 20, any opening in the illuminator which permits viewing is considered to be within the spirit and scope of the invention.

Figure 2:
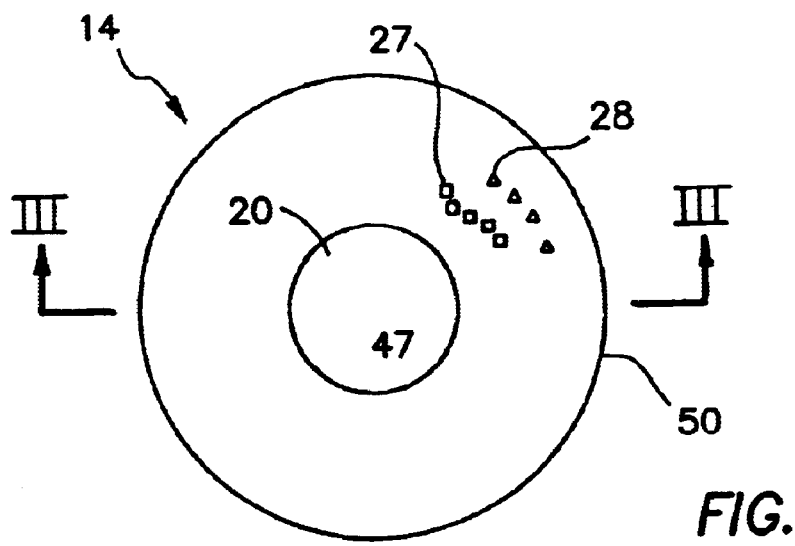
FIG. 2 is a section view taken along lines II—II of FIG. 1.
Figure 3:
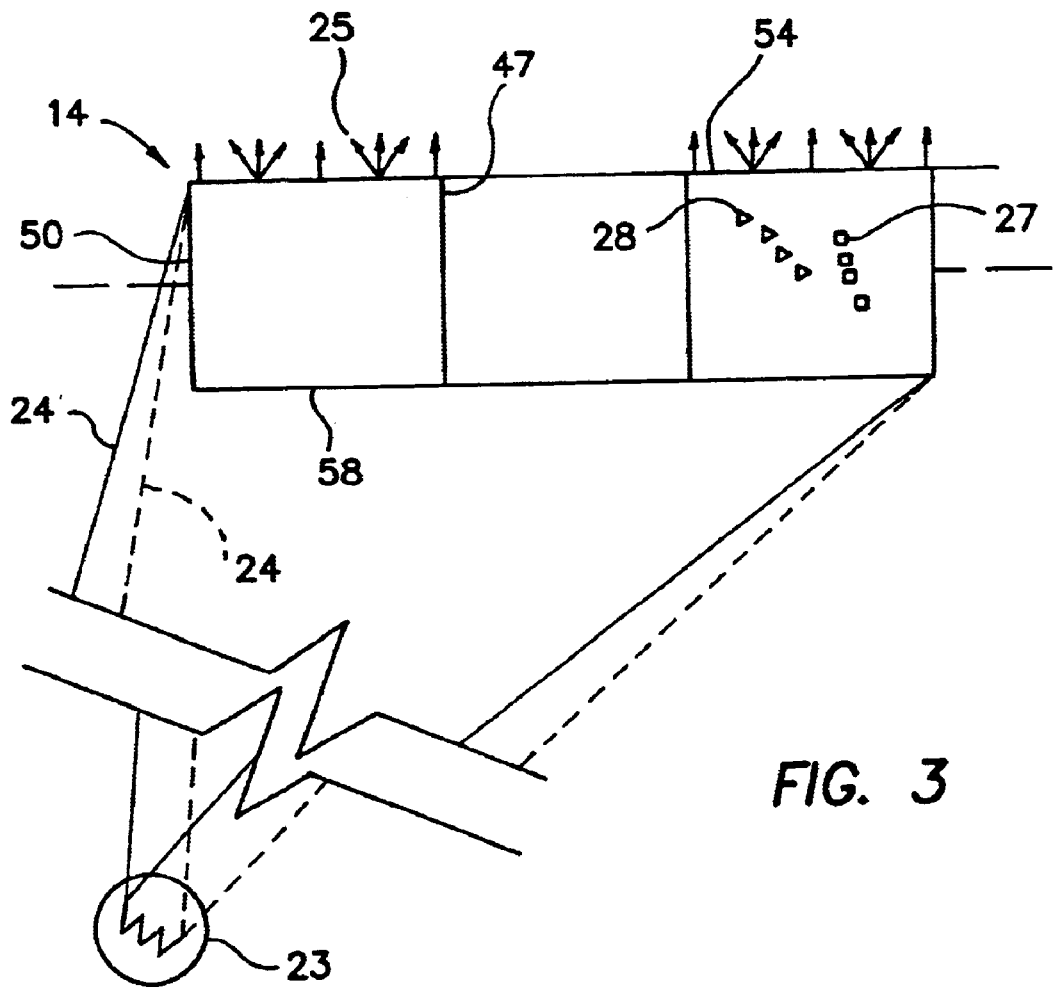
FIG. 3 is a sectional view of the illuminator and the light source of the instant invention taken along the lines III—III of FIG. 2.

The light source 23 may be at any location that has an unobstructed path from the light source 23 to the illuminator 14. FIG. 1 shows light 24 traveling from the light source 23 and striking the illuminator 14. Thus, the light 24 is incident light. Incident light 24 enters the illuminator 14 and is diffused therein. Diffused light radiates randomly in all directions. As shown in FIGS. 2 and 3, the illuminator 14 may comprise at least one chromophoric substance 27 and thereby converts the incident light 24 from a broad spectrum of frequencies and wave lengths to a relatively narrow range of frequencies and wave lengths. See, for example, U.S. Pat. No. 5,734,498, which has been incorporated herein, for a disclosure of the types of chromophoric and diffusing substances contemplated. It is expressly contemplated that no chromophoric substance may be included in illuminator 14.

The illuminator also comprises a substance 28 that diffuses the incident light 24 once it enters the illuminator 14. The converted and diffused light either reflects internally off of surfaces of the illuminator or is emitted from the illuminator 14. The emitted light 25 is actually emitted from all the surfaces of the illuminator 14. It can also be appreciated that the light source 23 should generally be located on the same side of specimen 16 as is the objective lens to avoid obstruction of the incident light 24. Light source can be directly embedded into polymer material or light can be delivered by waveguides into polymer material from a light source.

More specifically, the illumination element or illuminator 14 is formed as a matrix having a chromophoric material or substance 27 embedded therein (See FIG. 2). The matrix in the preferred embodiment is a polymeric matrix and also includes the diffusive material or substance 28. The diffusive material or substance 28 causes diffusion of radiant energy that passes into the illuminator from a radiant energy source. Polymer material can be encapsulated, wrapped, or placed in contact with optically absorbing and/or reflective material in order to further confine illumination output or geometrically constrain illumination aperture, or direct and/or control illumination field. In other words, the molecular structure of a polymer includes a matrix holding pattern. In a preferred embodiment, chromophoric material 27, or diffusive material 28 are embedded in the polymeric matrix to form the matrix of the invention.

For clarity, the illustration of the microscope 10 in FIG. 1 also includes the slide and/or slip 34 that carries the specimen 16, the eye piece 38, and the user's eye 43. As is well known, the image viewed by a user may be alternatively recorded by an imaging device such as a camera. It should by noted that the microscope of FIG. 1, is exceedingly simple and obviates the need of special lighting including a reflected light vertical illuminator and condensing lenses. The reflected light microscope can have high resolution due at least in part to the filtering effect of the chromophoric substance 27. That is, the conversion of the broad spectrum of light frequencies from, for example, a standard incandescent light to a relatively narrow spectrum of light to be emitted from the illuminator 14, has the positive effect of the reducing spectral impurities or frequencies that interfere with good imaging, but this is not required.

FIG. 2 shows a section view of the apertured illuminator 14 taken along lines II—II of FIG. 1. The toroid shape of the illuminator 14 is made clear by this sectional view. This view clearly shows the opening or aperture 20 that is formed by an inner side wall 47. As in the illustrated embodiment, this aperture may be circular or cylindrical in shape or there may be multiple apertures. Alternatively, it is contemplated that the opening may be of other shapes without departing from the spirit and scope of the invention. Likewise, an outer side wall 50 is illustrated as concentric to the inner side wall and circular or cylindrical in shape. Generally, the outer side wall may be formed to be surroundingly spaced outwardly from the inner side wall. However, any of a variety of shapes and sizes may be incorporated for the outer side wall 50.

FIG. 3 is a sectional view of the illuminator taken along lines III—III in FIG. 2. As set forth above the illuminator has a toroidal shape with inner and outer side walls 47, 50. As best shown in this Figure, the illuminator has substantially flat first and second surfaces 54, 58. As viewed these surfaces 54, 58 may be described as upper and lower surfaces 54, 58.

While the upper and lower surfaces 54, 58 are illustrated as flat and parallel to each other, this configuration is not necessary for the practice of the invention. Generally, the illuminator is provided with a surface forming a base that conforms to whatever element on which it is to be supported. The intent is that the illuminator be as close as possible to the specimen 16. It is contemplated that the illuminator may be supported on the specimen 16, a slip and/or slide 34 holding the specimen 16, or on some other support device near the specimen. It is within the spirit and scope of the invention to suspend the illuminator 14 near the specimen 16. With the chromophoric elements of the instant invention suspending the illuminator would work, while the complex prior art systems required too much precision in positioning of illuminators to permit suspension of the illuminators.

The shape of the illuminator 14 of the preferred embodiment may be generally expressed in another way. That is, it has an opening 20 that is formed by a closed curve inner wall 47 that extends from a first surface 54 to a second surface 58 opposite the first surface. The illuminator 14 further has a closed curve outer wall extending between the first and second surfaces and spaced outwardly and surroundingly of the inner wall. The outer and inner walls 50, 47 and the first and second surfaces 54, 58 together form a toroid.

The invention includes a method of using the microscope 10 that has an aperture or opening 20 through an illuminator 14. The microscope 10 also has an objective lens 18 and a radiant energy source 23 associated with the microscope, such that a specimen 16 may be observed by reflected light microscopy. The method includes the steps of stimulating the illuminator by radiant energy having a first frequency. The method also includes positioning the illuminator 14 on a same side of the specimen 16 as is the objective lens and the radiant source 23 relative to a plane 61 of the specimen 16 normal to the main axis of the objective lens.

Further, the method includes illuminating the specimen by light emitted from the illuminator in response to the stimulating effected by the radiant energy and observing the specimen through an aperture or opening 20 of the apertured illuminator 14.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An illuminator for reflected light microscopy, said illuminator comprising:
    an illumination element having a through opening adapted for placement on a main axis of an objective lens and through which reflected light from a specimen is viewed;
    said illumination element having light scattering properties; and
    said illumination element having:
        a first surface forming a base adapted for support on or near a microscope specimen,
        a second surface opposite said first surface, and side walls between said first and second surfaces.

2. The illuminator of claim 1, further comprising at least one chromophoric material which is fluorescent.

3. The illuminator of claim 2, wherein a radiant energy source is located on a same side of said specimen to be viewed as is said illuminator relative to a plane of said specimen normal to an optical path.

4. The illuminator of claim 1, wherein said through opening is formed by a cylindrical inner one of said side walls that extends from said first surface to said second surface opposite said first surface.

5. The illuminator of claim 4, wherein:
    said illumination element further has an outer one of said side walls extending between said first and second surfaces,
    said outer side wall is spaced outwardly and surroundingly with respect to said inner wall side wall.

6. The illuminator of claim 5, wherein said outer and inner side walls and said first and second surfaces together form a toroid.

7. The illuminator of claim 1, wherein said illuminator is adapted to be placed between an objective lens and said specimen to be viewed.

8. The illuminator of claim 1, wherein:
    said illumination element having light scattering properties comprises chromophoric material embedded therein; and a material that has at least one property that causes diffusion to diffuse radiant energy that passes into said illuminator from a radiant energy source.

9. A reflected light microscope with an arrangement that eliminates the need for condensing lenses and a reflected light vertical illuminator, comprising;

an objective lens, a radiant energy source, an illuminator; and wherein said illuminator has at least one chromophoric property and a through opening surrounding a main axis of said objective lens and through which reflected light from a specimen is viewed.

10. The microscope of claim 9, wherein said at least one scattering element is fluorescent.

11. The microscope of claim 10, wherein said radiant energy source is located on a same side of a specimen to be viewed as is said illuminator relative to a plane of said specimen normal to said main axis of said objective lens.

12. The microscope of claim 9, wherein said through opening is formed by a closed curve inner wall that extends from a first surface to a second surface opposite said first surface.

13. The microscope of claim 12, wherein said illumination element further has a closed curve outer wall extending between said first and second surfaces and spaced outwardly and surroundingly of said inner wall.

14. The microscope of claim 13, wherein said outer and inner walls and said first and second surfaces form a toroid.

15. The microscope of claim 12, wherein said illuminator has a height between said first surface and said second surface less than or equal to a working distance of said objective lens.

16. The microscope of claim 9, wherein said illuminator is located between said objective lens and said specimen to be viewed for reflected light microscopy.

17. The microscope of claim 9, wherein:

said illuminator is formed of a polymeric substance having chromophoric material embedded therein; and said illuminator comprises a material that has at least one property that causes diffusion of radiant energy that passes into said illuminator from said radiant energy source.

18. A method of using a microscope comprising an illuminator having a through opening, an objective lens, and a radiant energy source associated with the microscope, said microscope being configured for observing a specimen by reflected light microscopy, the method comprising the steps of:

positioning said illuminator on a same side of said specimen as said objective lens relative to a plane of said specimen normal to a main axis of said objective lens;

stimulating said illuminator by a radiant energy having a first frequency;

using at least one scattering particle to change said radient energy having a first frequency to light at a second frequency;

emitting the light at a second frequency from said illuminator; and illuminating said specimen by the light emitted from said illuminator at a second frequency in response to said stimulating by said radiant energy.

19. The method of claim 18, further comprising the step of observing the specimen through said opening of said illuminator.

* * * * *

UNITED STATES PATENT AND TRADEMARK OFFICE
CERTIFICATE OF CORRECTION

PATENT NO. : 6,661,574 B2
DATED : December 9, 2003
INVENTOR(S) : Tatiana B. Krasieva et al.

It is certified that error appears in the above-identified patent and that said Letters Patent is hereby corrected as shown below:

Column 1,
Line 6, should read as follows:
-- This invention was made with Government support under Grant No. RR01192, awarded by the National Institutes of Health. The Government has certain rights in this invention --

Signed and Sealed this

Twenty-second Day of June, 2004

JON W. DUDAS
*Acting Director of the United States Patent and Trademark Office*